(12) United States Patent
Richter

(10) Patent No.: US 7,595,396 B2
(45) Date of Patent: Sep. 29, 2009

(54) PROCESS FOR PREPARING POLYISOCYANATES CONTAINING IMINOOXADIAZINEDIONE GROUPS

(75) Inventor: Frank Richter, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 707 days.

(21) Appl. No.: 11/238,375

(22) Filed: Sep. 29, 2005

(65) Prior Publication Data

US 2006/0079694 A1     Apr. 13, 2006

(30) Foreign Application Priority Data

Oct. 7, 2004    (DE) ................ 10 2004 048 871

(51) Int. Cl.
*C07D 273/04*    (2006.01)
*C07C 263/027*   (2006.01)

(52) U.S. Cl. ........................ 544/67; 560/355

(58) Field of Classification Search ........... 544/66, 544/67; 560/355
See application file for complete search history.

(56) References Cited

U.S. PATENT DOCUMENTS

| | | | |
|---|---|---|---|
| 6,090,939 A | 7/2000 | Richter et al. | 544/67 |
| 6,107,484 A | 8/2000 | Richter et al. | 544/67 |
| 6,590,098 B2 * | 7/2003 | Richter et al. | 540/202 |
| 2003/0078361 A1 | 4/2003 | Richter et al. | 528/48 |

OTHER PUBLICATIONS

J. Prakt. Chem./Chem. Ztg., 336 (month unavailable) 1994, pp. 185-200, Hans Josef Laas et al. "Zur Synthese aliphatischer Polyisocyanate-Lackpolyisocyanate mit Biuret-,Isocyanurat-oder Uretdionstruktur".

* cited by examiner

*Primary Examiner*—James O Wilson
*Assistant Examiner*—Ebenezer Sackey
(74) *Attorney, Agent, or Firm*—Connolly Bove Lodge & Hutz LLP

(57) ABSTRACT

The present invention relates to process for preparing a polyisocyanate containing an iminooxadiazinedione group by trimerizing a portion of the isocyanate groups of a polyisocyanate, which does not contain iminooxadiazinedione groups, in the presence of a catalyst containing an anion corresponding to formula I)

$$(R^f)_n\text{—}CR'_{(3-n)}\text{—}C(O)O^- \qquad (I)$$

wherein
$R^f$ is a perfluorinated $C_1$-$C_{30}$ radical which is optionally branched, cyclic and/or unsaturated,
R' are identical or different, optionally heteroatom-containing substituents selected from H, $C_1$-$C_{20}$ alkyl and/or aryl and
n is 1 or 2.

4 Claims, No Drawings

PROCESS FOR PREPARING POLYISOCYANATES CONTAINING IMINOOXADIAZINEDIONE GROUPS

BACKGROUND OF THE INVENTION

1. Field of the Invention

The present invention relates to a new process for preparing aliphatic polyisocyanates having iminooxadiazinedione groups.

2. Description of Related Art

Polyisocyanates containing iminooxadiazinedione groups are raw materials which are of great interest for the production of polyurethane plastics and polyurethane coatings. Their preparation, described for example in EP-A 0 798 299, is accomplished using catalysts of saltlike composition whose anion contains fluorides, F$^-$, or di- or polyfluorides, [F—H—F]$^-$ or [(F—H)$_n$—F]$^-$ n>1, respectively.

In the latter cases it is necessary, for the purpose of catalyst preparation, to operate with hydrogen fluoride (HF), which because of the unpleasant physiological properties of the compound signifies a considerable safety expense and, moreover, is not universally possible technically. Catalysts prepared in an HF-free way, i.e. catalysts containing only fluoride anions, tetraalkylammonium fluorides or tetraalkylphosphonium fluorides, for example, have a storage stability which is poor, particularly in concentrated solution. They tend to discolor, which can have deleterious consequences for the quality of the polyisocyanates prepared using them. Although highly dilute solutions are more stable, they are poorly suited to the intended use in isocyanate trimerization with preferential formation of iminooxadiazinedione groups, since dilution is detrimental to the iminooxadiazinedione selectivity.

The use of compounds containing carboxylate groups in NCO oligomerization is known, although in that case typically the formation of isocyanurate is observed (J. Prakt. Chem./Chem. Ztg. 1994, 336, 185-200). The use of fluorinated carboxylate anions has not been described in this context.

It is an object of the present invention to provide alternative catalyst systems, i.e. fluoride or di- and polyfluoride-free catalyst systems, for the preparation of polyisocyanates containing iminooxadiazinedione groups.

This object may be achieved according to the invention by the use of the saltlike catalysts described hereinafter.

SUMMARY OF THE INVENTION

The present invention relates to process for preparing a polyisocyanate containing an iminooxadiazinedione group by trimerizing a portion of the isocyanate groups of a polyisocyanate, which does not contain iminooxadiazinedione groups, in the presence of a catalyst containing an anion corresponding to formula I)

$$(R^f)_n\text{—}CR'_{(3-n)}\text{—}C(O)O^- \qquad (I)$$

wherein $R^f$ is a perfluorinated $C_1$-$C_{30}$ radical which is optionally branched, cyclic and/or unsaturated, R' are identical or different, optionally heteroatom-containing substituents selected from H, $C_1$-$C_{20}$ alkyl and/or aryl and n is 1 or 2.

DETAILED DESCRIPTION OF THE INVENTION

Polyisocyanates which can be used in the process of the invention include all known compounds that contain NCO groups, preferably aliphatically, cycloaliphatically and/or araliphatically bound NCO groups.

Preferared compounds are hexamethylene diisocyanate (HDI), methylpentane diisocyanate (MPDI), trimethylhexane diisocyanate (TMDI), bis(isocyanatomethyl)cyclohexane ($H_6XDI$), norbornane diisocyanate (NBDI), isophorone diisocyanate, bis(isocyanatocyclohexyl)methane ($H_{12}MDI$) and mixtures thereof. Also suitable are higher molecular weight derivatives of these isocyanate compounds containing urethane, biuret, uretdione, isocyanurate and/or allophanate groups.

Suitable catalysts for carrying out the process of the invention include all compounds, alone or in admixture with one another, that contain anions of formula I). Examples include salts of 3,3,3-trifluoropropanoic acid, 4,4,4,3,3-pentafluorobutanoic acid, 5,5,5,4,4,3,3-heptafluoropentanoic acid, 6,6,6,5,5,4,4,3,3-nonafluorohexanoic acid, 7,7,7,6,6,5,5,4,4,3,3-undecafluoroheptanoic acid, 8,8,8,7,7,6,6,5,5,4,4,3,3-tridecafluorooctanoic acid, 9,9,9,8,8,7,7,6,6,5,5,4,4,3,3-pentadecafluorononanoic acid, 10,10,10,9,9,8,8,7,7,6,6,5,5,4,4,3,3-heptadecafluorodecanoic acid, 11,11,11,10,10,9,9,8,8,7,7,6,6,5,5,4,4,3,3-heptadecafluoroundecanoic acid, 2-trifluoromethyl-3,3,3-trifluoropropanoic acid, 2-trifluoromethyl-4,4,4,3,3-penta-fluorobutanoic acid, 2-trifluoromethyl-5,5,5,4,4,3,3-heptafluoropentanoic acid, 2-trifluoromethyl-6,6,6,5,5,4,4,3,3-nonafluorohexanoic acid, 2-trifluoromethyl-7,7,7,6,6,5,5,4,4,3,3-undecafluoroheptanoic acid, 2-trifluoromethyl-8,8,8,7,7,6,6,5,5,4,4,3,3-tridecafluorooctanoic acid, 2-trifluoromethyl-9,9,9,8,8,7,7,6,6,5,5,4,4,3,3-pentadecafluorononanoic acid, 2-trifluoromethyl-10,10,10,9,9,8,8,7,7,6,6,5,5,4,4,3,3-heptadecafluorodecanoic acid, 2-trifluoromethyl-11,11,11,10,10,9,9,8,8,7,7,6,6,5,5,4,4,3,3-heptadecafluoroundecanoic acid, 3,3-bis(trifluoromethyl)-4,4,4,-trifluorobutanoic acid,-3,3-bis(trifluoromethyl)-5,5,5,4,4-pentafluoropentanoic acid, 3,3-bis(trifluoromethyl)-6,6,6,5,5,4,4-heptafluorohexanoic acid, 3,3-bis(trifluoromethyl)-7,7,7,6,6,5,5,4,4-nonafluoroheptanoic acid, 3,3-bis(trifluoromethyl)-8,8,8,7,7,6,6,5,5,4,4-undecafluorooctanoic acid, 3,3-bis(trifluoromethyl)-9,9,9,8,8,7,7,6,6,5,5,4,4-tridecafluorononanoic acid, 3,3-difluoroprop-2-enoic acid, 4,4,4,3-tetrafluorobut-2-enoic acid, 5,5,5,4,4,3-hexa-fluoropent-2-enoic acid, 6,6,6,5,5,4,4,3-octafluorohex-2-enoic acid, 7,7,7,6,6,5,5,4,4,3-decafluorohept-2-enoic acid, 8,8,8,7,7,6,6,5,5,4,4,3-dodecafluorooct-2-enoic acid, 9,9,9,8,8,7,7,6,6,5,5,4,4,3-tetradecafluoronon-2-enoic acid and 10,10,10,9,9,8,8,7,7,6,6,5,5,4,4,3-hexadecafluorodec-2-enoic acid.

Preferred catalysts are quaternary ammonium salts and phosphonium salts of the preceding acids, preferably tetraalkylammonium or tetraalkylphosphonium salts having 1 to 30 carbon atoms in the alkyl radical.

Particularly preferred catalysts are quaternary ammonium salts and phosphonium salts of the following acids: 3,3,3-trifluoropropanoic acid, 4,4,4,3,3-pentafluorobutanoic acid, 5,5,5,4,4,3,3-heptafluoropentanoic acid, 6,6,6,5,5,4,4,3,3-nonafluorohexanoic acid, 7,7,7,6,6,5,5,4,4,3,3-undecafluoroheptanoic acid, 8,8,8,7,7,6,6,5 5,4,4,3,3-tridecafluorooctanoic acid, 9,9,9,8,8,7,7,6,6,5,5,4,4,3,3-pentadecafluorononanoic acid, 10,10,10,9,9,8,8,7,7,6,6,5,5,4,4,3,3-heptadecafluorodecanoic acid, 3,3-difluoroprop-2-enoic acid, 4,4,4,3-tetrafluorobut-2-enoic acid, 5,5,5,4,4,3-hexafluoropent-2-enoic acid, 6,6,6,5,5,4,4,3-octafluorohex-2-enoic acid, 7,7,7,6,6,5,5,4,4,3-decafluorohept-2-enoic acid, 8,8,8,7,7,6,6,5,5,4,4,3-dodecafluorooct-2-enoic acid, 9,9,9,8,8,7,7,6,6,5,5,4,4,3-tetradecafluoronon-2-enoic acid and 10,10,10,9,9,8,8,7,7,6,6,5,5,4,4,3-hexadecafluorodec-2-enoic acid and also 3,3-bis(trifluoromethyl)-6,6,6,5,5,4,4-heptafluorohexanoic acid.

Since these compounds are generally solid or have a high viscosity, catalyst solvents are generally needed for their use in the isocyanate trimerization of the invention. Examples of suitable solvents include straight-chain and branched, primary, secondary and tertiary alcohols having one to twenty carbon atoms and optionally further heteroatoms, especially oxygen, which must not be attached directly to a hydrogen atom. It is preferred to use solvents of the aforementioned kind which have one to twelve carbon atoms, e.g. methanol, ethanol, n- and isopropanol, 1- and 2-butanol, isobutanol, 2-ethylhexanol, methoxypropanol, ethylene glycol methyl ether or diethylene glycol methyl ether.

The amount of catalyst to be used in the process of the invention is guided primarily by the desired reaction rate and is 0.001 to 1 mole %, based on the sum of the molar amounts of the isocyanate used and the catalyst. It is preferred to use 0.01 to 0.5 mole % of catalyst.

The process of the invention is carried at a temperature of 0° C. to 150° C., preferably 40° C. to 120° C.

The process of the invention is conducted such that the conversion of the NCO groups amounts to 5 to 90 mole %, preferably 10 to 60 mole % and more preferably 10 to 50 mole %. In order to achieve NCO-group conversions within these ranges, the reaction is terminated at the desired degree of conversion.

For terminating the reaction after the desired degree of conversion has been reached, known catalyst poisons are suitable (cf. J. Prakt. Chem./Chem. Ztg. 1994, 336, 185-200 and references cited therein) such as strong organic or inorganic acids and also their acid chlorides. Occasionally an increase in temperature as well is sufficient for effective catalyst deactivation ('thermal stopping').

Following deactivation of the catalyst the unreacted monomer and any solvent used can be separated off by means of known separation techniques, such as distillation, extraction or crystallization/filtration. Preferred is distillation, especially thin-film distillation, where appropriate. Combinations of two or more of these techniques can also be employed. Preferably the unreacted monomer is removed by distillation.

If it is intended that the polyisocyanate prepared in accordance with the invention should still contain free, unreacted monomer (which may be of interest, for example, for its further processing to NCO-blocked products), then following catalyst deactivation it is possible to ommit monomer removal.

For the implementation of the process of the invention it is unimportant whether the process is carried out wholly or partly batchwise or continuously.

Additionally it is possible in the process of the invention to add known stabilizers and additives from polyisocyanate chemistry at any desired time. Examples include antioxidants such as sterically hindered phenols (e.g., 2,6-di-tert-butylphenol or 4-methyl-2,6-di-tert-butylphenol); light stabilizers such as HALS amines, triazoles, etc.; weak acids or catalysts for the NCO—OH reaction such as dibutyltin dilaurate (DBTL).

Products prepared by the process of the invention and prepared from optionally branched, linear aliphatic di- or polyisocyanates containing no cycloalkyl substituents are pale in color and have a viscosity <100,000 mPa.s/23° C. When cycloaliphatic and/or araliphatic di- or polyisocyanates are used, the resins obtained are solid or have a high viscosity (viscosity >100,000 mPa.s/23° C.).

In low-monomer-content form, i.e. following removal of unreacted monomer, the products of the invention have an NCO content of <27% by weight, preferably <25% by weight.

The polyisocyanates prepared by the process of the invention may be used as starting materials for producing (optionally foamed) moldings, paints, coating materials, adhesives or adjuvants.

All of the known methods are suitable for blocking the free NCO groups. Blocking agents include, in particular, phenols (e.g. phenol, nonylphenol or cresol), oximes (e.g. butanone oxime or cyclohexanone oxime), lactams (e.g. ε-caprolactam), secondary amines (e.g. diisopropylamine), pyrazoles (e.g. dimethylpyrazole), imidazoles, triazoles or malonic acid esters and acetic acid esters.

The polyisocyanates containing iminooxadiazinedione groups that are prepared by the process of the invention can be used in particular for preparing one- and two-component polyurethane paints, optionally in mixtures with other, known di- or polyisocyanates, such as di- or polyisocyanates containing biuret, urethane, allophanate, isocyanurate and/or iminooxadiazinedione groups.

Also preferred is the use of the polyisocyanates prepared in accordance with the invention from optionally branched, linear-aliphatic isocyanates as reactive diluents for lowering the viscosity of polyisocyanate resins of relatively high viscosity.

In order to convert the polyisocyanates prepared in accordance with the invention to the polyurethane it is possible to use any compounds having at least two isocyanate-reactive groups, individually or in any desired mixtures with one another (isocyanate-reactive binder).

Preference is given to using one or more of the isocyanate-reactive binders which are known in polyurethane chemistry, such as polyhydroxy compounds or polyamines. Preferred polyhydroxy compounds are polyester polyols, polyether polyols, polyacrylate polyols and/or polycarboxylic acid polyols, with the further addition where appropriate of low molecular weight polyhydric alcohols.

The equivalent ratio between the isocyanate groups of the products prepared by the process of the invention, which may optionally be blocked, and the isocyanate-reactive groups of the binder, such as OH—, NH— or COOH, is 0.8 to 3, preferably 0.8 to 2.

For accelerating the crosslinking reaction of the polyisocyanates of the invention with the isocyanate-reactive binder it is possible to use the catalysts known from polyurethane chemistry. Examples include metal salts such as dibutyltinIV dilaurate, tinII bis(2-ethylhexanoate), bismuthIII tris(2-ethylhexanoate), zincII bis(2-ethylhexanoate) or zinc chloride; and also tertiary amines such as 1,4-diazabicyclo(2.2.2)octane, triethyl amine or benzyldimethylamine.

At the formulation stage the inventively prepared optionally blocked polyisocyanate, the isocyanate-reactive binder, catalyst(s) and optionally known additives (such as pigments, fillers, flow control aids, defoamers and/or matting agents) are mixed with one another on a customary mixing apparatus, such as a sand mill, with the use of solvents where appropriate, and the mixture is homogenized.

Suitable solvents include the known paint solvents such as ethyl acetate, butyl acetate, ethylene or propylene glycol monomethyl, monoethyl or monopropyl ether acetate, 2-butanone, 4-methyl-2-pentanone, cyclohexanone, toluene, xylene, solvent naphtha and N-methylpyrrolidone.

The coating compositions can be applied in solution or from the melt and also, where appropriate, in solid form (powder coating compositions) by known methods such as brushing, rolling, pouring, spraying, dipping, the fluid-bed sintering method or electrostatic spraying methods to the article to be coated. Suitable substrates include all known materials, especially metals, wood, plastics and ceramic.

EXAMPLES

The invention is further illustrated but is not intended to be limited by the following examples in which all parts and percentages are by weight unless otherwise specified.

The NCO content of the resins described in the inventive and comparison examples was determined by titration in accordance with DIN 53 185.

The dynamic viscosities were determined at 23° C. using the VT 550 viscometer with PK 100 cone-plate measurement setup from Haake. Measurements at different shear rates ensured that the flow behavior of the inventive polyisocyanate mixtures described and that of the comparison products corresponded to that of ideal Newtonian liquids. Therefore, there is no need to state the shear rate.

The reporting of mole % or of the molar ratio of different structural types to one another is based on measurements by NMR spectroscopy. Unless identified otherwise, it always refers to the sum of the structural types formed by the modification reaction (oligomerization) from the previously free NCO groups. The measurements are made on the DPX 400 instrument from Bruker on samples at about 5% ($^1$H NMR) or about 50% ($^{13}$C NMR) in dry $CDCl_3$ at a frequency of 400 MHz ($^1$H NMR) or 100 MHz ($^{13}$C NMR). References selected for the ppm scales are small amounts of tetramethylsilane in the solvent, with a $^1$H chemical shift of 0 ppm ($^1$H NMR) or the solvent itself ($CDCl_3$) with a shift of 77.0 ppm ($^{13}$C NMR). Data for the chemical shift of the compounds in question was taken from the literature (cf. Die Angewandte Makromolekulare Chemie 1986, 141, 173-183 and references cited therein) or obtained by measurement carried out on model substances. The 3,5-dimethyl-2-methylimino-4,6-diketo-1,3,5-oxadiazine (iminooxadiazinedione-type methyl isocyanate trimer), obtainable from methyl isocyanate by a method based on that described in Ber. d. dtsch. Chem. Ges. 1927, 60, 295 had the following NMR chemical shifts (in ppm): 3.09; 3.08 and 2.84 ($^1$H NMR, $CH_3$) and, respectively, 148.3; 144.6 and 137.3 ($^{13}$C NMR, C=O/C=N). Iminooxadiazinediones of aliphatic diisocyanates such as HDI, for example, have very similar $^{13}$C NMR chemical shifts of the C=O/C=N atoms and can doubtlessly be distinguished as such from other isocyanate derivatives.

$CF_3CH_2COOH$ was acquired commercially from the company ABCR GmbH & Co. KG, D-76187 Karlsruhe, Del and $(CF_3)_2CH-COOH$ was acquired from the company Aldrich, 82018 Taufkirchen, Del, and used without further purification.

Relatively long-chain, partially fluorinated alkanecarboxylic acids of the formula $R^f-CH_2-COOH$ were prepared starting from the corresponding alcohols of the formula $R^f-CH_2-CH_2-OH$, which are available under the trade name Fluowet® EA from Clariant GmbH, Sulzbach, Del, by oxidation with Jones reagent by the method described in J. Fluorine Chem. 1995, 70 19-26.

Preparation of Catalyst I 0.5 g of 3,3,3-trifluoropropanoic acid were dissolved in 1 ml of methanol with stirring using a magnetic stirrer rod and 0.7 g of a 30% strength solution of sodium methoxide in methanol was added dropwise. With gentle heating, a white emulsion was formed. After 30 minutes of stirring, 1 ml of methanol was added and subsequently 1.63 g of a 70% strength isopropanolic solution of tetrabutylphosphonium chloride were added dropwise. After 2 hours of stirring at room temperature the mixture was filtered (200 μm filter plates), the precipitate was washed repeatedly with methanol and the combined filtrates were concentrated under vacuum at 10 mbar at room temperature. The $CF_3CH_2CO_2^-Bu_4P^+$ content of the resultant solution as determined by $^1$H NMR spectroscopy was 92%. Also found were 2% isopropanol and 6% methanol. In the $^{19}$F NMR spectrum the only visible signal was that of the $CF_3$ group at −63.3 ppm. Catalysts II-V and A1-A3, which are used in the examples below, were prepared in the same way. The corresponding catalyst solutions are compiled in Table 1.

TABLE 1

| No. | Catalyst Formula of anion | Formula of cation | Concentration [%] |
|---|---|---|---|
| | for inventive examples | | |
| I | $CF_3CH_2CO_2^-$ | $Bu_4P^+$ | 92[1] |
| II | $CF_3CH_2CO_2^-$ | $C_{14}H_{29}(C_6H_{13})_3P^+$ | 73[2] |
| III | $CF_3(CF_2)_7CH_2CO_2^-$ | $Bu_4P^+$ | 93 |
| IV | $CF_3(CF_2)_6CF=CHCO_2^-$ | $Bu_4P^+$ | 85[3] |
| V | $CF_3(CF_2)_2C(CF_3)_2CH_2CO_2^-$ | $Bu_4P^+$ | 93[4] |
| | for comparison examples | | |
| A1 | $CH_3(CH_2)_4CO_2^-$ | $Me_4N^+$ | 1, in 1,3-butanediol |
| A2 | $CF_3(CF_2)_2(CH_2)_2CO_2^-$ | $Bu_4P^+$ | 99, in methanol |
| A3 | $CF_3(CF_2)_7CO_2^-$ | $Bu_4P^+$ | 98, in methanol |

[1] in isopropanol/methanol, approximately 1:3
[2] in methanol/methoxypropanol, 1:4.4
[3] in methanol
[4] in isopropanol/methanol, approximately 1:3

Example 1

Inventive 10.4 g (61.8 mmol) of freshly degassed HDI, stirred in a glass vessel with septum at 50° C. under nitrogen using a magnetic stirrer rod, were admixed with 24 mg of catalyst solution I (0.06 mmol of $CF_3CH_2CO_2^-Bu_4P^+$; corresponding to 0.1 mole % of catalyst, based on HDI). At regular intervals thereafter the progress of the reaction was ascertained by measuring the refractive index of the reaction mixture (at 20° C. and the frequency of the light of the D line of the sodium spectrum, $n_D^{20}$) (start=no conversion=$n_D^{20}$ of pure HDI=1.4523). After 5.5 h the progress of the reaction, at $n_D^{20}$=1.4635, was stopped by adding 25 mg of a 40% strength solution of p-toluenesulphonic acid in isopropanol. The NMR-spectroscopic ratio of isocyanurate to iminooxadiazinedione groups was 1:1.

Example 2

Inventive

In a four-necked round-bottomed flask with stirrer, internal thermometer, metering means for the catalyst and reflux condenser, and attached to an inert gas unit (nitrogen), 200 g (1.19 mol) of HDI were freed from dissolved gases by stirring for 30 minutes under vacuum (0.1 mbar) at 60° C. Following introduction of nitrogen, 0.55 g of catalyst solution II was added dropwise in portions over the course of 30 minutes. During this addition the internal temperature of the reaction mixture rose slightly to 62° C. After a further hour of stirring at 60° C., the $n_D^{20}$ of the reaction mixture was 1.4588. Subsequently further reaction was stopped by adding 0.25 g of a 40% strength solution of p-toluenesulphonic acid in isopropanol. The NMR-spectroscopic ratio of isocyanurate to iminooxadiazinedione groups was 53:47. Work-up of the reaction mixture by thin-film distillation at 0.1 mbar and 150° C. gave 32 g of a polyisocyanate resin having the following data:
NCO content: 24.1%
Viscosity @23° C.: 640 mPa.s.

Example 3

Inventive

The procedure set out in Example 1 was repeated with the difference that 44.6 mg of catalyst III (0.062 mmol of $CF_3(CF_2)_7CH_2CO_2^-Bu_4P^+$; corresponding to 0.1 mole % of catalyst, based on HDI) were used. After 2 h of stirring at 50° C. the $n_D^{20}$ of the reaction mixture was 1.4789. Subsequently further reaction was stopped by adding 27 mg of a 40% strength solution of p-toluenesulphonic acid in isopropanol. The NMR-spectroscopic ratio of isocyanurate to iminooxadiazinedione groups was 47:53.

Example 4

Inventive

The procedure set out in Example 1 was repeated with the difference that 44.6 mg of catalyst IV (0.05 mmol of $CF_3(CF_2)_6CF=CHCO_2^-Bu_4P^+$; corresponding to 0.09 mole % of catalyst, based on HDI) were used. After 2.5 h of stirring at 50° C. the $n_D^{20}$ of the reaction mixture was 1.4875. Subsequently further reaction was stopped by adding 2.3 mg of a 40% strength solution of p-toluenesulphonic acid in isopropanol. The NMR-spectroscopic ratio of isocyanurate to iminooxadiazinedione groups was 62:38.

Example 5

Inventive

The procedure set out in Example 1 was repeated with the difference that 39.3 mg of catalyst V (0.06 mmol of $CF_3(CF_2)_2C(CF_3)_2CH_2CO_2^-Bu_4P^+$; corresponding to about 0.1 mole % of catalyst, based on HDI) were used. After 2 hours of stirring at 50° C. the $n_D^{20}$ of the viscous reaction mixture was 1.4902. Subsequently further reaction was stopped by adding 25 mg of a 40% strength solution of p-toluenesulphonic acid in isopropanol. The NMR-spectroscopic ratio of isocyanurate to iminooxadiazinedione groups was 64:36.

Comparison Example C1

The procedure set out in Example 2 was repeated with the difference that 500 g of HDI were admixed dropwise over 15 minutes with a total of 3 g of catalyst solution A1 at a rate such that the internal temperature of the reaction mixture rose to not more than 69° C. Following a further hour of stirring at 60° C., the $n_D^{20}$ of the reaction mixture was 1.4627. The titrated NCO content of the mixture had dropped to 43.4%. Subsequently further reaction was stopped by adding 0.07 g of dibutyl phosphate. In the NMR spectrum, besides isocyanurate and allophanate, only traces of iminooxadiazinedione were found. Work-up of the reaction mixture by means of thin-film distillation at 0.1 mbar and 150° C. gave 114 g of a polyisocyanate resin having the following data:
NCO content: 22.6%
Viscosity @23° C.: 1700 mPa.s.

Comparison Example C2

The procedure set out in Example 1 was repeated with the difference that 31 mg of catalyst A2 (0.06 mmol of $CF_3(CF_2)_2(CH_2)_2CO_2^-Bu_4P^+$; corresponding to 0.1 mole % of catalyst, based on HDI) were used. After stirring at 50° C. for 3 hours, the $n_D^{20}$ of the reaction mixture had risen to 1.4710. Besides isocyanurate, only traces of iminooxadiazinedione were found in the NMR spectrum.

Comparison Example C3

The procedure set out in Example 1 was repeated with the difference that 448 mg of catalyst A3 (0.06 mmol of $CF_3(CF_2)_7 CO_2^-Bu_4P^+$; corresponding to 1 mole % of catalyst, based on HDI) were used. Not until after 24 hours of stirring at 50° C. had the $n_D^{20}$ of the reaction mixture risen somewhat (1.4608), which in view of the very high catalyst-concentration and the long reaction time indicates that A3 is virtually inert with respect to the desired NCO oligomerization, particularly the formation of iminooxadiazinedione.

As Comparison Examples C1-C3 show, not all carboxylates with partially fluorinated chains are suitable for catalyzing the formation of iminooxadiazinedione. Only those which have one or two non-fluorinated carbon atoms between the perfluoroalkyl group and the carboxylate group are active catalysts, and a significant iminooxadiazinedione selectivity is observed only in the presence of a non-fluorinated carbon atom between the perfluoroalkyl group and the carboxylate group.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a polyisocyanate containing an iminooxadiazinedione group which comprises trimerizing a portion of the isocyanate groups of a polyisocyanate, which does not contain an iminooxadiazinedione group, in the presence of a catalyst containing an anion corresponding to formula (I)

wherein
$R^f$ is a perfluorinated $C_1$-$C_{30}$ radical which is optionally branched, cyclic, and/or unsaturated;
R' are identical or different, optionally heteroatom-containing substituents selected from the group consisting of H, $C_1$-$C_{20}$ alkyl, and aryl; and
n is 1 or 2; and
wherein the counterion to the anion of formula (I) is a quaternary ammonium cation or phosphonium cation.

2. A process for preparing a polyisocyanate containing an iminooxadiazinedione group which comprises trimerizing a portion of the isocyanate groups of a polyisocyanate, which does not contain an iminooxadiazinedione group, in the presence of a catalyst containing an anion corresponding to formula (I)

wherein

R$^f$ is a perfluorinated $C_1$-$C_{30}$ radical which is optionally branched, cyclic, and/or unsaturated, R' are identical or different, optionally heteroatom-containing substituents selected from the group consisting of H, $C_1$-$C_{20}$ alkyl, and aryl; and n is 1 or 2; and wherein said polyisocyanate, which does not contain an iminooxadiazinedione group, has aliphatically and/or cycloaliphatically bound NCO groups; and wherein the counterion to the anion of formula (I) is a quaternary ammonium cation or phosphonium cation.

3. The process of claim 1, wherein said catalyst comprises a quaternary ammonium salt or a quaternary phosphonium salt of 3,3,3-trifluoropropanoic acid, 4,4,4,3,3-pentafluorobutanoic acid, 5,5,5,4,4,3,3-heptafluoropentanoic acid, 6,6,6,5,5,4,4,3,3-nonafluorohexanoic acid, 7,7,7,6,6,5,5,4,4,3,3-undecailuoro-heptanoic acid, 8,8,8,7,7,6,6,5,5,4,4,3,3-tridecafluorooctanoic acid, 9,9,9,8,8,7,7,6,6,5,5,4,4,3,3-pentadecafluorononanoic acid, 10,10,10,9,9,8,8,7,7,6,6,5,5,4,4,3,3-heptadecatluorodecanoic acid, 3,3-ditluoroprop-2-enoic acid, 4,4,4,3-tetrafluorobut-2-enoic acid, 5,5,5,4,4,3-hexafluoropent-2-enoic acid, 6,6,6,5,5,4,4,3 -octafluorohex-2-enoic acid, 7,7,7,6,6,5,5,4,4,3-decafluorohept-2-enoic acid, 8,8,8,7,7,6,6,5,5,4,4,3- dodecafluorooct-2-enoic acid, 9,9,9,8,8,7,7,6,6,5,5,4,4,3-tetradecafluoronon-2-enoic acid, 10,10,10,9,9,8,8,7,7,6,6,5,5,4,4,3-hexadecafluorodec-2-enoic acid, or 3,3- bis(trifluoromethyl)-6,6,6,5,5,4,4-heptafluorohexanoic acid.

4. The process of claim 2, wherein said catalyst comprises a quaternary ammonium salt or a quaternary phosphonium salt of 3,3,3-trifluoroproparioic acid, 4,4,4,3,3- pentafluorobutanoic acid, 5,5,5,4,4,3,3-heptafluoropentanoic acid, 6,6,6,5,5,4,4,3,3-nonafluorohexanoic acid, 7,7,7,6,6,5,5,4,4,3,3-undecafluoro-heptanoic acid, 8,8,8,7,7,6,6,5,5,4,4,3,3-tridecafluorooctanoic acid, 9,9,9,8,8,7,7,6,6,5,5,4,4,3,3-pentadecafluorononanoic acid, 10,10,10,9,9,8,8,7,7,6,6,5,5,4,4,3,3-heptadecafluorodecanoic acid, 3,3-difluoroprop-2-enoic acid, 4,4,4,3-tetrafluorobut-2-enoic acid, 5,5,5,4,4,3-hexafluoropent-2-enoic acid, 6,6,6,5,5,4,4,3-octalluorohex-2-enoic acid, 7,7,7,6,6,5,5,4,4,3-decafluorohept-2-enoic acid, 8,8,8,7,7,6,6,5,5,4,4,3- dodecafluorooct-2-enoic acid, 9,9,9,8,8,7,7,6,6,5,5,4,4,3-tetradecafluoronon-2-enoic acid, 10,10,10,9,9,8,8,7,7,6,6,5,5,4,4,3-hexadecafluorodec-2-enoic acid, or 3,3- bis(trifluoromethyl)-6,6,6,5,5,4,4-heptafluorohexanoic acid.

* * * * *